United States Patent
Li et al.

(10) Patent No.: US 11,148,804 B2
(45) Date of Patent: Oct. 19, 2021

(54) SYSTEM AND METHOD FOR TRACKING TARGETS

(71) Applicant: SZ DJI TECHNOLOGY CO., LTD., Shenzhen (CN)

(72) Inventors: Peiliang Li, Shenzhen (CN); Cong Zhao, Shenzhen (CN); Xuyang Feng, Shenzhen (CN); Jie Qian, Shenzhen (CN); Qifeng Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 92 days.

(21) Appl. No.: 16/263,708

(22) Filed: Jan. 31, 2019

(65) Prior Publication Data
US 2019/0168870 A1    Jun. 6, 2019

Related U.S. Application Data

(63) Continuation of application No. PCT/CN2016/093768, filed on Aug. 6, 2016.

(51) Int. Cl.
*B64C 39/02* (2006.01)
*G05D 1/12* (2006.01)
(Continued)

(52) U.S. Cl.
CPC .......... *B64C 39/024* (2013.01); *G05D 1/0094* (2013.01); *G05D 1/12* (2013.01);
(Continued)

(58) Field of Classification Search
CPC ........ B64C 2201/027; B64C 2201/108; B64C 2201/127; B64C 2201/141; B64C 39/024; G05D 1/0094; G05D 1/12; G06K 9/0063
See application file for complete search history.

(56) References Cited

U.S. PATENT DOCUMENTS 9,497,380 B1 * 11/2016 Jannard .............. H04N 5/23238
10,157,452 B1 * 12/2018 Tighe ................. G06K 9/00771
(Continued)

FOREIGN PATENT DOCUMENTS

CN    101667032 A    3/2010
CN    101702233 A    5/2010
(Continued)

OTHER PUBLICATIONS

The World Intellectual Property Organization (WIPO) The International Search Report and Written Opinion for PCT/CN2016/093768 dated Apr. 26, 2017 7 pages.

*Primary Examiner* — Behrang Badii
*Assistant Examiner* — Daniel L Greene
(74) *Attorney, Agent, or Firm* — Anova Law Group, PLLC

(57) ABSTRACT

A method of tracking a movement of a target by an unmanned aerial vehicle (UAV) includes determining a distance between the target and the UAV, acquiring image data of the target by a camera of the UAV, determining two-dimensional pixel coordinate data associated with a plurality of features of the target from the image data, determining a physical dimension based on the two-dimensional pixel coordinate data and the distance, and determining three-dimensional location coordinate data of the target with respect to the UAV based on the physical dimension and at least one of the two-dimensional pixel coordinate data or the distance.

15 Claims, 7 Drawing Sheets

(51) Int. Cl.
*G05D 1/00* (2006.01)
*G06K 9/00* (2006.01)

(52) U.S. Cl.
CPC ...... *G06K 9/0063* (2013.01); *B64C 2201/027* (2013.01); *B64C 2201/108* (2013.01); *B64C 2201/127* (2013.01); *B64C 2201/141* (2013.01)

(56) References Cited

U.S. PATENT DOCUMENTS

| | | | |
|---|---|---|---|
| 2007/0288132 | A1 | 12/2007 | Lam |
| 2008/0228437 | A1* | 9/2008 | Damarla ................. G01S 5/18 702/151 |
| 2009/0021423 | A1 | 1/2009 | Cheng et al. |
| 2016/0047890 | A1* | 2/2016 | Ryan ..................... G01S 1/70 398/118 |
| 2016/0196667 | A1* | 7/2016 | Densham ............... H04N 9/315 348/169 |
| 2016/0217614 | A1* | 7/2016 | Kraver ................. G06T 19/006 |
| 2017/0102467 | A1* | 4/2017 | Nielsen ................. G01S 19/47 |

FOREIGN PATENT DOCUMENTS

| | | |
|---|---|---|
| CN | 102156481 A | 8/2011 |
| CN | 102334142 A | 1/2012 |
| CN | 103149939 A | 6/2013 |
| CN | 103838244 A | 6/2014 |
| CN | 104298248 A | 1/2015 |
| CN | 104599287 A | 5/2015 |
| CN | 105578034 A | 5/2016 |
| WO | 2016074169 A1 | 5/2016 |

* cited by examiner

SYSTEM AND METHOD FOR TRACKING TARGETS

CROSS-REFERENCE TO RELATED APPLICATION

This application is a continuation of International Application No. PCT/CN2016/093768, filed on Aug. 6, 2016, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

TECHNICAL FIELD

The present disclosure relates generally to visual tracking of targets and, more particularly, to systems and methods of tracking movement of a target in a three-dimensional space based on a combination of image data of the target and a location of the target.

BACKGROUND

Unmanned aerial vehicles ("UAV"), sometimes referred to as "drones," include pilotless aircraft of various sizes and configurations that can be remotely operated by a user or programmed for automated flight. UAVs can be used for many purposes and are often used in a wide variety of personal, commercial, and tactical applications. For instance, UAVs can be equipped with imaging equipment, such as cameras, video cameras, etc. UAVs equipped with imaging devices find particular use in the surveillance, national defense, and professional videography industries, among others, besides being popular with hobbyists and for recreational purposes.

UAVs equipped with imaging equipment may allow users to track a target remotely. This ability to track a target allows the UAVs to operate autonomously while tracking the movement of the object, to facilitate the imaging of the target. As an illustrative example, the UAV can be configured to autonomously track a movement of the object and to adjust its speed and direction of movement accordingly, to maintain a predetermined relative position from the object. With such an arrangement, the UAV can maintain a predetermined field of view of the object, such that the images of object can be captured with substantially the same scope and precision while the object is in motion.

One way of tracking the motion of the target, under the current technologies, is by tracking the three-dimensional positions of the target. The three-dimensional position information can be provided by a satellite navigation system, such as Global Positioning System (GPS), BeiDou, Galieo, etc. For example, a standalone GPS receiver can obtain its three-dimensional position based on information received from four or more satellites.

Such an approach poses challenges to the tracking process. For example, if a target is equipped with a standalone GPS receiver, the target itself may be able to provide more accurate three-dirmensional position information for tracking. However, such a receiver is typically bulky and very power-consuming. Moreover, a standalone GPS receiver typically generates the position information at a relatively slow refresh rate (e.g., 10 Hz or slower), which makes it challenging to track a fast-moving target. In a case where the UAV controls its own movement autonomously based on a result of the tracking, when the UAV fails to track the target, it may go out of control and pose safety hazards to others.

Accordingly, there is an existing need to improve the responsiveness and accuracy of tracking a target (e.g., by a UAV), such that it becomes more robust.

SUMMARY

The disclosed embodiments include methods, systems, articles of manufacture, and UAVs configured to track a movement of a target. The techniques described in the disclosed embodiments may be used to track the position of a target based on a combination of image data of the target and a location of the target. The disclosed embodiments determine a distance between the target and a tracker, and a physical dimension associated with the target based on two-dimensional pixel data locations from image data of the target and the distance. The disclosed embodiments then determine three-dimensional location coordinate data of the target based on the physical dimension, and at least one of the two-dimensional pixel coordinate data or the distance. The disclosed embodiments provide enhanced accuracy, usability, and robustness in their ability to track a movement of a target under various operation conditions.

In the disclosed embodiments, a system may receive absolute two-dimensional location coordinate data of a target. The system may also receive absolute three-dimensional location coordinate date of the tracker. The two-dimensional location coordinate data of the target and the three-dimensional location coordinate date of the tracker can be generated by, for example, a global positioning system (GPS), or any satellite navigation system. The system can then determine the two-dimensional location coordinate data of the target with respect to the tracker based on these location coordinate data.

In one aspect, the disclosed embodiments may extract the plurality of features of the target from the image data, determine pixel locations for the plurality of features, and determine the two-dimensional pixel coordinates based on the pixel locations.

In another aspect, the disclosed embodiments may receive updated image data and determine second three-dimensional location coordinate data of the target with respect to the tracker based on the updated image data. The disclosed embodiments may determine updated two-dimensional location coordinate data of the target with respect to the tracker; determine third three-dimensional location coordinate data of the target with respect to the tracker based on the updated two-dimensional location coordinate data; and determine a location of the target based on a combination of the second and third three-dimensional location coordinate data using a Kalman filter.

In a further aspect, the disclosed embodiments may also determine whether pixels associated with the plurality of the features are included within the updated image data. If the pixels associated with the plurality of the features are not included within the updated image data, the disclosed embodiments may determine, based on the physical dimension and previously-determined three-dimensional location coordinate data, updated three-dimensional location coordinate data of the target with respect to the tracker.

The techniques described in the disclosed embodiments may be performed by any apparatus, system, or article of manufacture, including a movable object such as a UAV, or a controller, or any other system configured to receive image data (including video data) and track targets shown in the received images. Unlike prior tracking systems, the techniques described herein can more accurately track targets that may be moving at high speeds.

It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings, which are incorporated in and constitute a part of this specification, illustrate several embodiments and, together with the description, serve to explain the disclosed principles. In the drawings.

DETAILED DESCRIPTION

The disclosed embodiments provide systems and methods for improved tracking of a target and, more particularly, tracking movement of a target in a three-dimensional space based on a combination of image data and location data of the target. The resulting systems and methods provide enhanced accuracy, usability, and robustness in their ability to track a movement of a target under various operation conditions.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
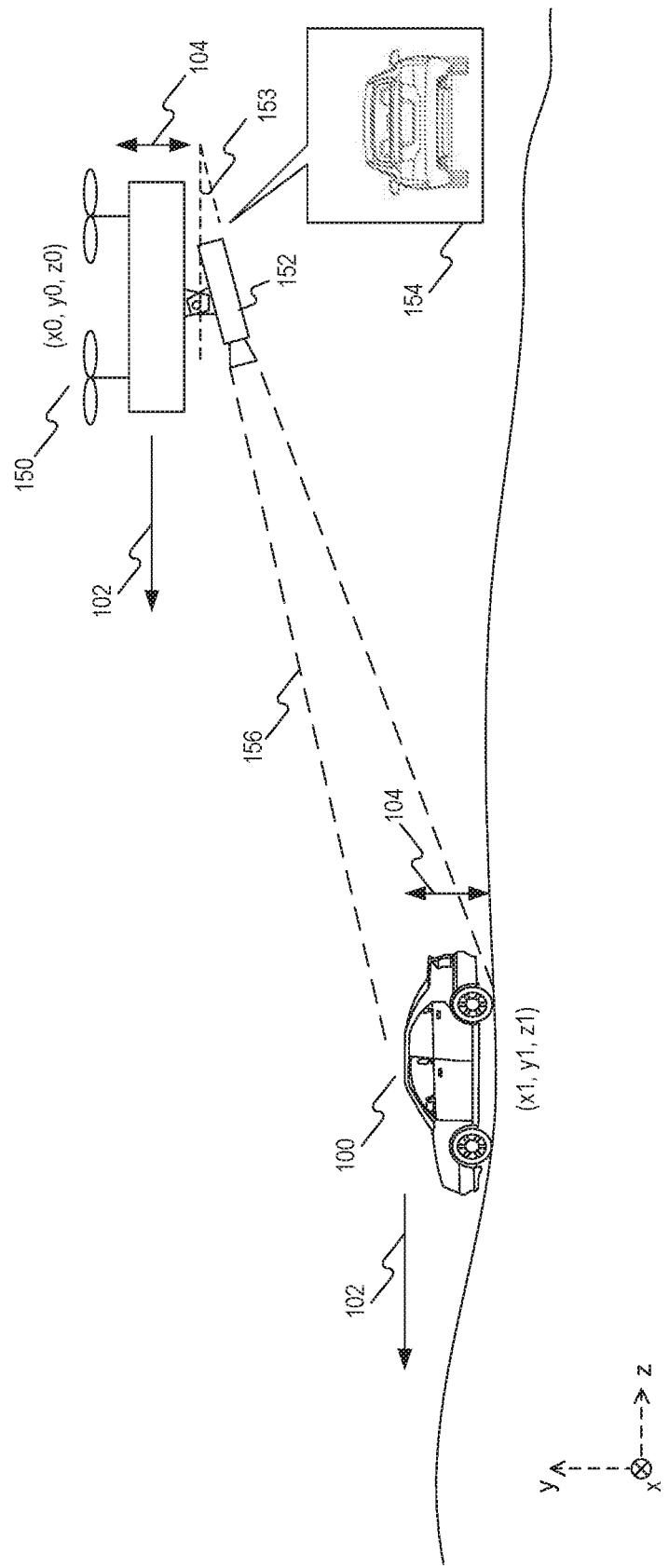
FIG. 1 illustrates an environment in which exemplary embodiments of the present disclosure can be used.

FIG. 1 is a diagram of an environment in which exemplary embodiments of the present disclosure can be used. As shown in FIG. 1, a target 100 (e.g., a vehicle, or any movable object) is moving on terrain along a first axis 102 (e.g., along a z-axis parallel to the horizon). Target 100 may also move along a second axis 104 (e.g., along a y-axis that is orthogonal to the z-axis) because the terrain is uneven. A tracker 150 also follows first target 100. Tracker 150 includes a camera 152. Target 100 is within a field of view 156 of a camera 152 mounted on tracker 150, which can capture one or more images 154 of target 100. In some embodiments, camera 152 can be configured to move and to form a variable pitch angle 153 with respect to first axis 102. In some embodiments, the pitch angle 153 is not variable with respect to tracker 150, but tracker 150 can itself change its pitch angle (and thus the pitch angle of camera 152) with respect to first axis 102. In some embodiments, the pitch angle can be changed by a combination of the movement of camera 152 and tracker 150.

According to some embodiments, tracker 150 may be any suitable object, device, mechanism, system, or machine configured to travel on or within a suitable medium (e.g., a surface, air, water, rails, space, underground, etc.). For example, tracker 150 may be an unmanned aerial vehicle (UAV) that is movable using one or more propellers. Although tracker 150 is shown and described herein as a UAV for exemplary purposes of this description, it will be understood that other types of movable objects (e.g., wheeled objects, nautical objects, locomotive objects, other aerial objects, or the like) may also or alternatively be used in embodiments consistent with this disclosure. As used herein, the term UAV may refer to an aerial device configured to be operated and controlled autonomously (i.e., via an electronic control system) and/or manually by off-board personnel.

In some embodiments, tracker 150 is configured to track a movement of target 100, such that tracker 150 can maintain a constant three-dimensional relative position with respect to target 100. The tracking can be performed to maintain the scope of imaging of target 100. For example, if target 100 travels uphill and moves up along a vertical direction, tracker 150 can also move up accordingly (and/or change pitch angle 153), so that target 100 remains within field of view 156. Moreover, the tracking can be performed to maintain the precision of imaging of target 100. For example, if target 100 changes speed along a horizontal direction, tracker 150 can also change its speed accordingly to maintain the distance separating the two objects, such that camera 152 receives the same intensity of light reflected off target 100, and can capture images 154 of target 100 with the same resolution.

In order for tracker 150 to track a movement of target 100, tracker 150 may need to obtain three-dimensional location information of itself (e.g., as indicated by location coordinates (x0, y0, z0) in FIG. 1). Tracker 150 also needs to determine a three-dimensional location of target 100 (e.g., as indicated by location coordinates (x1, y1, z1) in FIG. 1). Based on these two pieces of three-dimensional location information, tracker 150 can then determine a relative position of target 100, in a three-dimensional space, with respect to camera 152. Tracker 150 can then change (or maintain) its own motion (as well as updating or maintaining pitch angle 153) to maintain that relative position.

Figure 2:
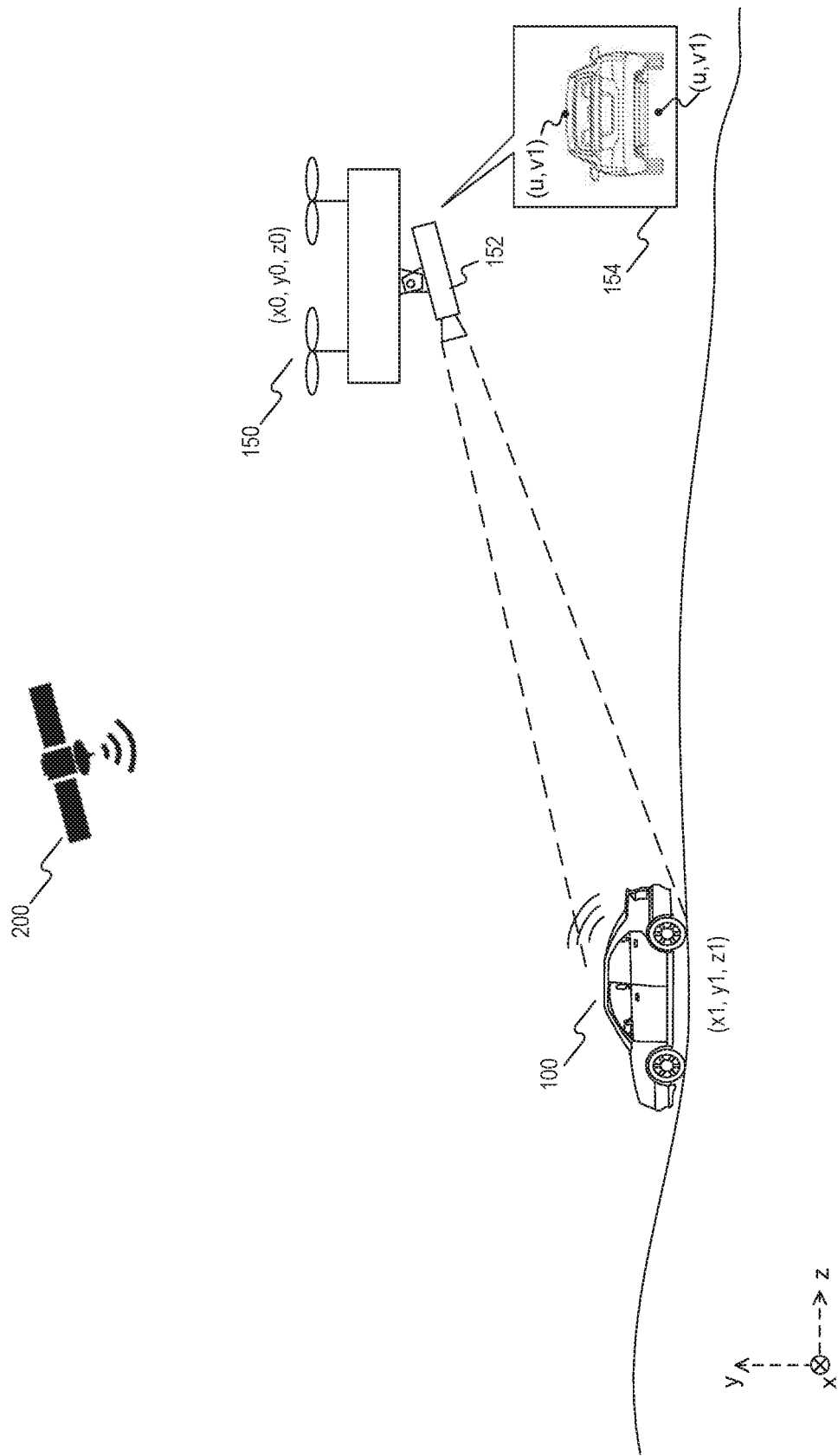
FIGS. 2 and 3 illustrate a method of determining three-dimensional coordinates of a target based on image data and location data of the target, according to embodiments of the present disclosure.
Figure 3:
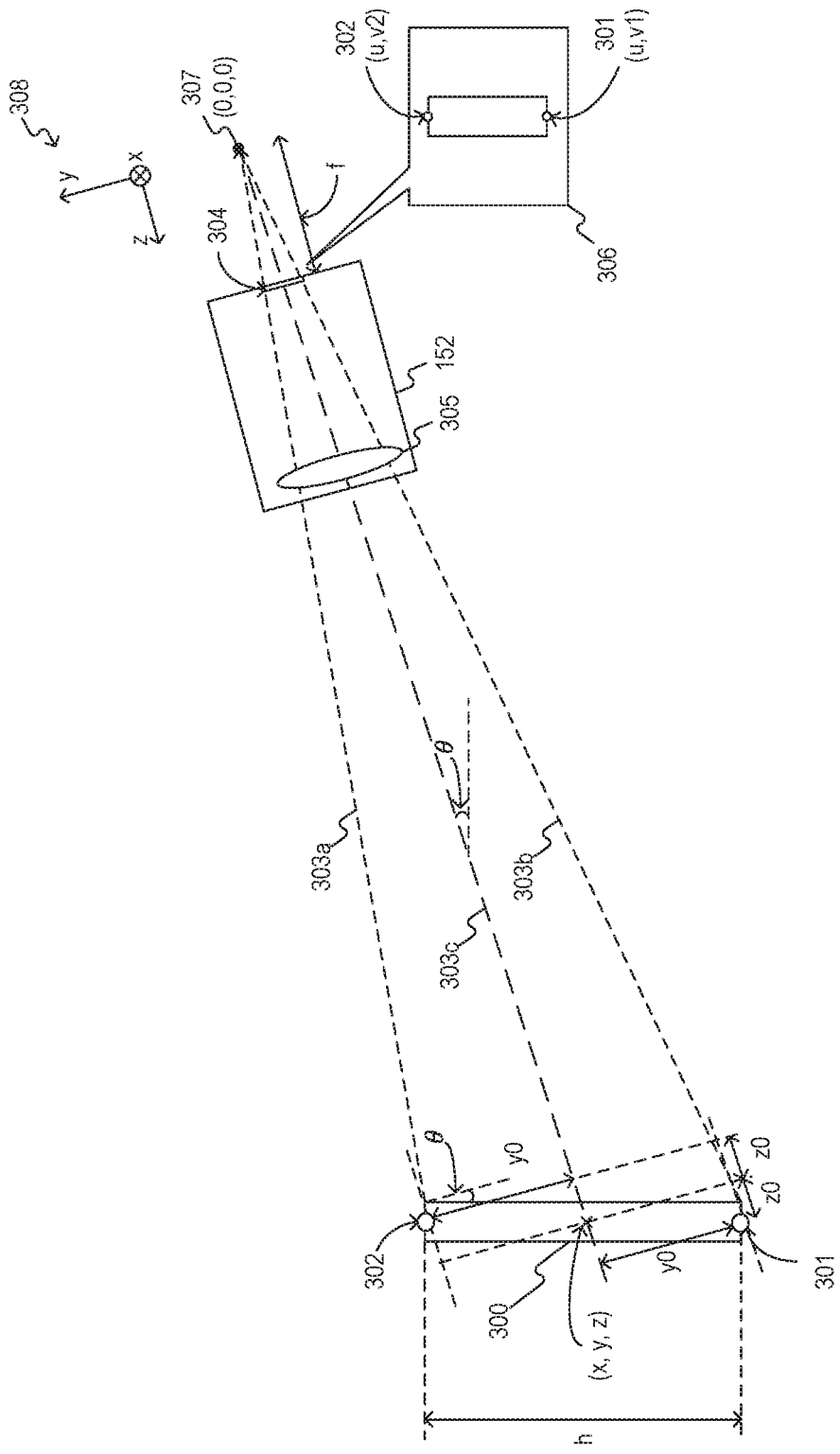

Reference is now made to FIGS. 2 and 3, which illustrate a method of determining three-dimensional location coordinates of a target based on image data of the target and the target's location, according to embodiments of the present disclosure. As discussed above, tracker 150 may obtain its own three-dimensional location information, and to determine a three-dimensional location of target 100, to maintain a constant three-dimensional relative position with respect to target 100. For example, tracker 150 may include a GPS receiver (or other satellite navigation systems) that receives signals from satellites 200 to generate its own three-dimensional coordinates (x0, y0, z0).

Tracker 150 may also determine a three-dimensional location of target 100 by determining a distance between target 100 and tracker 150. For example, tracker 150 may receive two-dimensional location information of target 100 along the x-z plane, to determine the x1 and z1 coordinates of target 100, which can determine a horizontal distance between the tracker and the target. Tracker 150 may also determine a two-dimensional location of target 100 along the y-z plane (and/or the x-y plane) to determine the y1 coordinate of target 100 from, for example, image 154 of target 100. For example, the pixel data of image 154 may also provide two-dimensional pixel coordinate information of the target within an image frame (e.g., (u, v1) and (u, v2) of FIG. 2), which can also be tracked as target 100 moves. As to be discussed below, tracker 150 can combine these information to generate a three-dimensional location of target 100.

Target 100 may receive two-dimensional location information along the x-z plane from various sources. For example, target 100 may include a device that can generate two-dimensional location coordinates (x1, z1) information and transmit the information directly to tracker 150. As an illustrative example, in a case where target 100 is a vehicle, as shown in FIG. 2, a passenger in the vehicle may carry a mobile phone that includes a GPS receiver (or a receiver associated with other satellite navigation systems) that receives signals from satellites 200 to generate two-dimensional location coordinates of the mobile phone (and of target 100). The mobile phone may be configured (e.g., via an app) to establish a peer-to-peer connection with tracker 150, and transmit the two-dimensional location coordinates of the mobile phone to tracker 150. The mobile phone may also be configured to transmit the two-dimensional location coordinate information to a server (e.g., via a cellular communication network), which can then relay the two-dimensional location coordinate information of target 100 to tracker 150.

As another illustrative example, a third party can also generate the two-dimension location coordinate information of the mobile phone. For example, a phone service provider can provide an estimation of the location of a mobile phone through triangulation among a number of cell towers that communicate with the mobile phone, and may provide the location information to tracker 150.

In some embodiments, the two-dimensional location coordinate information of target 100 can be generated based on a combination of GPS data and information about a motion of target 100. For examples, the mobile phone in target 100 that transmits the two-dimensional location coordinate information may include an inertia measurement unit (IMU) configured to determine a speed and a direction of motion of the mobile phone (and of target 100). The mobile phone can combine the GPS data and the motion data using an optimization algorithm (e.g., Kalman filter) to generate adjusted two-dimensional location coordinates to provide a more accurate measurement of the mobile phone's location. The mobile phone can then provide the adjusted two-dimensional location coordinates to tracker 150 (or to a third-party server that provides the information to tracker 150).

Accordingly, embodiments of the present disclosure provide a method and a system of tracking a movement of a target in a three-dimensional space based on a combination of two-dimensional pixel coordinates of the target, derived from the image data of the target, and two-dimensional location coordinates of the target as well as three-dimensional location coordinates of the tracker obtained from satellite navigation systems (e.g., GPS). As to be discussed below in FIG. 3, a tracking system can determine, based on the three-dimensional location coordinates of the tracker and the two-dimensional location coordinates of the target, a distance between the tracker and the target. Moreover, the system can also determine, based on the distance and the two-dimensional pixel coordinates of the target within an image, a physical dimension associated with the target (e.g., a height, a width, a distance between two features on a surface of the target, etc.). Based on the physical dimensional of the target, as well as the distance between the target and the tracker, the system can determine three-dimensional location coordinates of the target. The system can also track the three-dimensional location coordinates of the target when the target is moving, by detecting changes (if any) in the two-dimensional pixel coordinates of the target reflected in subsequent images of the target, based on an assumption that the physical dimension associated with the object does not change.

FIG. 3 illustrates an example of a method of determining the three-dimensional location coordinates of the target based on a combination of two-dimensional pixel coordinates of the target, two-dimensional location coordinates of the target, and three-dimensional location coordinates of the tracker, according to embodiments of the present disclosure. As shown in FIG. 3, a target 300, with features (e.g., vehicle rooftop and wheels) 301 and 302, is within a field of view of camera 152 (attached to tracker 150 of FIG. 2), which includes an image sensor 304 and a lens 305. Camera 152 forms a pitch angle of θ with respect to the horizon. Features 301 and 302 are separated by a physical dimension h. Light rays reflected off features 301 and 302 may travel via, respectively, paths 303a and 303b into camera 152, through lens 305, and can be captured by image sensors 304, to form an image 306. As shown in FIG. 3, in image 306, the pixels representing features 301 and 302 are associated with two-dimensional pixel coordinates of, respectively, (u, v1) and (u, v2). The light rays that go through lens 305 can converge at a point 307, which is at a focal distance f behind image sensors 304. The distance f can be related to a physical attribute (e.g., a focal length) of lens 305.

As shown in FIG. 3, point 307 can be the origin of a three-dimensional coordinate system 308 that includes an x-axis, a y-axis, and a z-axis orthogonal to each other, with the x-axis pointing out of the page and the x-z plane forming the pitch angle of θ with respect to the horizon. The center of target 300 is associated with three-dimensional location coordinates (x, y, z) within coordinate system 308, such that target 300 is separated from point 307 by a distance of x along the x-axis of system 308, by a distance of y along the y-axis of coordinate system 308, and by a distance of z along the z-axis of coordinate system 308. In a case where the three-dimensional location coordinates (x, y, z) collocates with a center of target 300, and the center aligns with focal axis 303c of lens 305, a value of the y coordinate can be zero. In a case where the center of the target does not align with focal axis 303c, the system can also determine a value of the y coordinate based on, for example, the pixel location of center of target reflected in the image, pitch angle θ, and three-dimensional location coordinates of camera 152.

Further, as shown in FIG. 3, feature 302 is separated from point 307 by a distance of (z−z0) along the z-axis of system 308, and a distance of (y+y0) along the y-axis of system 308. Moreover, feature 301 is separated from point 307 by a distance of (z+z0) along the z-axis of system 308, and a distance of (y−y0) along the y-axis of system 308. The values of x, y, z, y0, and z0 can be related to a relative location of target 300 with respect to camera 152 (and tracker 150).

The following expressions illustrate a relationship between the two-dimensional pixel coordinates (u, v1) and (u, v2) of target 300 within image 306 and the physical dimension h associated with target 300. These expressions also illustrate a relationship between the physical dimension h and the three-dimensional location coordinates (x, y, z) of target 300.

$$u = f \times \frac{x}{z} \quad \text{(Expression 1)}$$

$$v1 = f \times \frac{(y - y0)}{(z + z0)} \quad \text{(Expression 2)}$$

$$v2 = f \times \frac{(y + y0)}{(z - z0)} \quad \text{(Expression 3)}$$

$$y0 = \frac{h \times \cos(\theta)}{2} \quad \text{(Expression 4)}$$

$$z0 = -\frac{h \times \sin(\theta)}{2} \quad \text{(Expression 5)}$$

One or more values of u, v1, v2, f, x, y, z, y0, z0, and θ can be determined based on these relationships. For example, a tracking system can extract pixel data that correspond to features 301 and 302, and determine the two-dimensional pixel location coordinates (u, v1) and (u, v2) associated with the extracted pixel data. The system can also obtain the values of location coordinates x and z based on, for example, two-dimensional location coordinates of target 300 and three-dimensional location coordinates of camera 152, both of which can be obtained from GPS, as well as pitch angle θ and distance f. As an illustrative example, based on the location coordinates, the system can determine a relative three-dimensional location of target 300 with respect to camera 152 on a two-dimensional horizontal plane. As an illustrative example, assuming that the relative two-dimensional location coordinates of target 300, with respect to image sensors 304 of camera 152, is (x', z'), the coordinates x and z can be determined based on the expressions below:

$$x = \frac{x'}{\cos(\theta)} + f \quad \text{(Expression 6)}$$

$$z = \frac{z'}{\cos(\theta)} + f \quad \text{(Expression 7)}$$

The system may also determine coordinate y based on the image data. For example, system may determine, based on a location of an image of target 300 within image 306, whether the center of target 300 aligns with focal axis 303c. The system may then determine that a value of the y coordinate accordingly, as discussed above.

Further, the system can also include a gyroscope (or other suitable hardware/software components) to determine the pitch angle θ of camera 152. With focal distance f known as well (e.g., as a property of lens 305), and the values of x and z also determined, the system can determine the values of y0 and z0 based on expressions 1 to 3, and the value of physical dimension h based on expressions 4 and 5.

In some embodiments, the value of physical dimension h can also be determined based on a property of target 300 and can be determined independently from the rest of the parameters of expressions 1-7. As an illustrative example, referring back to FIG. 2, if the value of physical dimension h refers to a height of target 100 (e.g., a vehicle), the physical dimension can be determined based on the known height of the vehicle (e.g., a height associated with a particular model of the vehicle). The system may also acquire the physical dimension from the same source of information from which the system acquire the three-dimension coordinates of the target (e.g., from the mobile phone of a passenger in a vehicle, from a third party server that relays the three-dimensional coordinate information of the target, etc.)

Assuming the physical dimension does not change as the target moves, the system can determine a second set of three-dimensional coordinates (x, y, z) and the values of y0 and z0 based on the physical dimension and two-dimensional pixel location coordinates (u, v1) and (u, v2) determined from subsequent image data of the target. For example, if the relative location of target 300 with respect to camera 152 changes, the values of x, y, z, y0, and z0 can change, while the value of physical dimension (h) may remain constant. The system may determine second set of three-dimensional location coordinates of target 300 by extracting pixel data for features 301 and 302 from the subsequent images, and determining the updated two-dimensional pixel location coordinates. The system may then determine the second three-dimensional location coordinates based on the updated pixel location coordinates, as well as previously-determined value of physical dimension (h), according to expressions 1-7.

In some embodiments, the system may also receive updated two-dimensional location coordinates of target 300 from GPS (or from other satellite navigation system), and generate third set of three-dimensional location coordinates of target 300 based on the updated two-dimensional location coordinates. The system can then combine the second and third three-dimensional location coordinates to determine a location of the target 300. In some embodiments, the system may employ an optimization algorithm, such as a Kalman filter, to determine a parametrized model that tracks a location of target 300. The system may first determine the parameters associated with the parameterized model based on the second set of three-dimensional location coordinates. When the third set of three-dimensional location coordinates become available, the system can then update the parametrized model based on the third set of three-dimensional location coordinates, as well, as the speed and direction of motion of the system, the effect of noise and timing uncertainty, the effect of filtering, etc., as the target moves.

In some embodiments, based on various operation conditions, the system can also use the historical values for some of the parameters of expressions 1-7 to determine the location of the target. For example, in a case where the system determines the physical dimension based on the two-dimensional pixel coordinates in image 306, the system may maintain a running average for the value of physical dimension, to reduce the effect of noise, until tracker 150 changes a course of movement and exhibits a certain degree of change in yaw angle. In this case, since the field of view of camera 152 has changed, the system may determine to reset the running average with the new value of the physical dimension.

Moreover, in a case where the camera 152 stops capturing images of target 300 (e.g., when the field of view has been obstructed), the system can use the previously determined physical dimension values, as well as a part of the previously determined three-dimensional location coordinates, to determine the location of target 300. As an illustrative example, based on a determination that target 300 is moving on flat terrain, the system may assume that the y coordinate of target 300 (which can determine a vertical distance between tracker 150 and the target) remains constant. In this case, the system may determine the x and z coordinate of the target based on, for example, previously-determined physical dimension value h, previously-determined values for y and y0, and the three-dimensional coordinates of target 300 and camera 152 obtained from GPS (or other navigation systems).

In some embodiments, based on a determination of the location of target 300, tracker 150 can also adjust at least one of the direction or the speed of its movement, to maintain a relative position with respect to target 300. For example, based on a determination that target 300 is changing its speed and/or direction of movement, tracker 150 can also adjust its speed and/or direction of movement accordingly.

Figure 4:
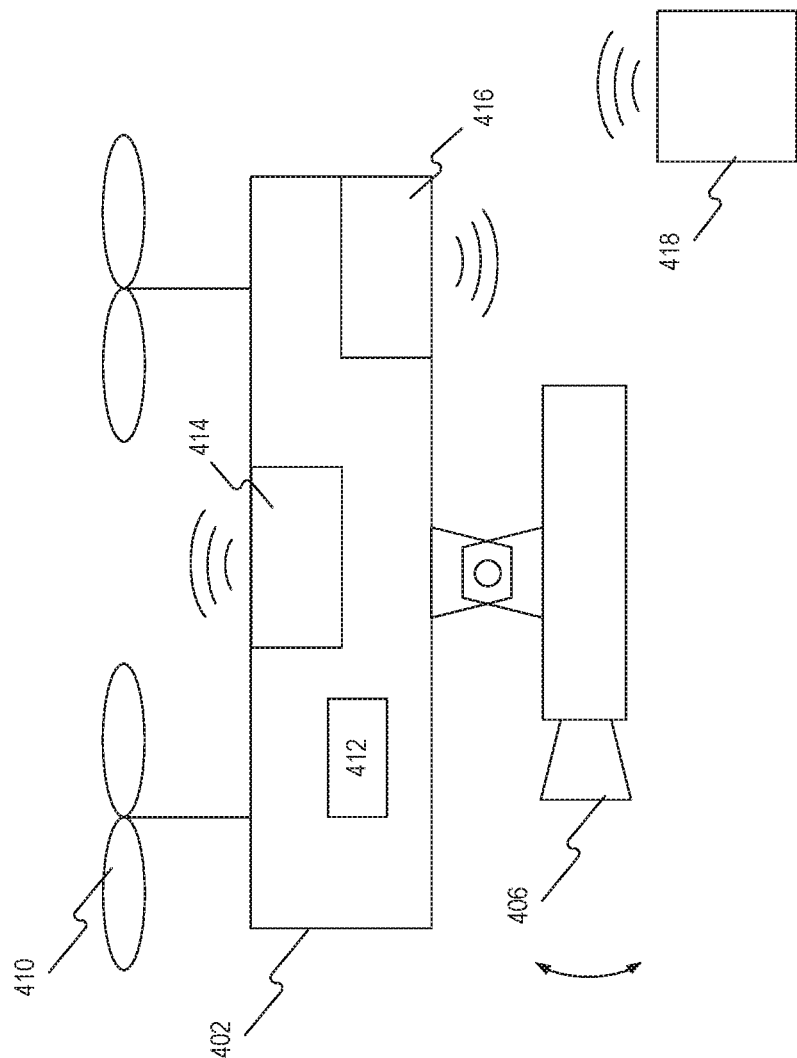
FIGS. 4 and 5 are schematic diagrams of an exemplary system for determining three-dimensional coordinates of a target based on target image and location data, according to embodiments of the present disclosure.

Reference is now made to FIG. 4, which is a diagram of an exemplary system 400 for performing one or more operations in accordance with the disclosed embodiments. As shown in FIG. 4, system 400 may include a housing 402, imaging equipment 406 (e.g., a camera) to capture the images of a target, and one or more propellers 410. In some embodiments, imaging equipment 406 may be coupled with housing 402 via a hinge or a gimbal, and can form a variable angle with respect to housing 402. Housing 402 may include mechanical components such as motors and actuators to control the motions of imaging equipment 406 and propellers 410. Housing 402 may also include an inertial measurement unit (IMU) 412 configured to detection a motion of system 400. IMU 412 may include sensor components such as accelerometer, gyroscopes, magnetometers, etc.

Housing 402 may also house one or more communication systems 414 and 416. Communication system 414 can enable system 400 to receive its three-dimensional coordinates from a satellite navigation system (e.g. GPS). Communication system 416 can enable system to receive the three-dimensional coordinates of the target of which the images are captured by imaging equipment 406. For example, communication system 416 may receive the three-dimensional location coordinates of the target from a mobile phone 418 attached to the target. As another example, communication system 416 may receive the three-dimensional location coordinates of the target from a third party server (not shown), which receives the three-dimensional coordinate information from mobile phone 418.

Figure 5:
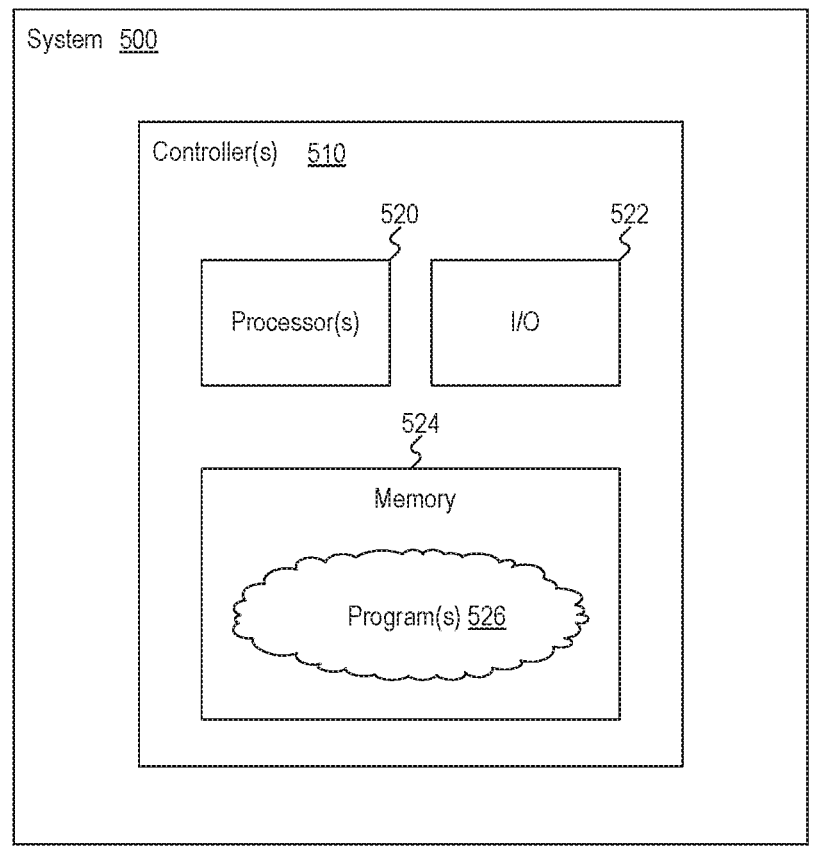

Housing 402 may also house a tracking system that includes one or more processors, one or more input/output (I/O) devices, and one or more memories. Reference is now made to FIG. 5, which is a schematic block diagram of an exemplary system 500 that may be used in accordance with the disclosed embodiments. System 500 may include one or more processors 520, one or more I/O devices 522, and one or more memories 524, which in some embodiments may be implemented within one or more controllers 510. In some embodiments, system 500 may take the form of a mobile computing device, general-purpose computer, etc., for performing one or more operations consistent with the disclosed embodiments.

Processor 520 may include one or more known processing devices. For example, the processor may be from the family of processors manufactured by Intel, from the family of processors manufactured by Advanced Micro Devices, or the like. Alternatively, the processor may be based on the ARM architecture. In some embodiments, the processor may be a mobile processor. The disclosed embodiments are not limited to any type of processor configured in controller 510.

I/O devices 522 may be one or more devices configured to allow data to be received and/or transmitted by the controller 510. The I/O devices 522 may include one or more communication devices and interfaces, and any necessary analog-to-digital and digital-to-analog converters, to communicate with and/or control other mechanical components and devices, such as imaging equipment 406, propellers 410, IMU 412, and communication systems 414 and 416.

Memory 524 may include one or more storage devices configured to store software instructions used by the processor 520 to perform functions related to the disclosed embodiments. For example, the memory 524 may be configured to store software instructions, such as program(s) 526, that perform one or more operations when executed by the processor(s) 520. For example, memory 524 may include a single program 526, such as a user-level application, a tracking system, etc. that perform the functions of the disclosed embodiments, or may comprise multiple software programs. Additionally, the processor 520 may execute one or more programs (or portions thereof) remotely located from the controller 510. Furthermore, memory 524 also may be configured to store data, for example, for use by the software program(s) 526.

In some embodiments, systems 400 and 500 can be configured as tracker 150 of FIGS. 1-3, and software program(s) 526 can include one or more software modules that, when executed by controllers 510, perform a method of determining three-dimensional coordinates of a target based on image data of the target and the target's location, consistent with embodiments of the present disclosure.

For example, referring back to FIG. 3, software program(s) 526 can include one or more software modules configured to process the image data captured by imaging equipment 406 to extract one or more features, and to determine two-dimensional pixel coordinates (u, v1) and (u, v2) of the extracted features. Software program(s) 526 can also include software modules configured to obtain the three-dimensional coordinates of system 400 and target 300 via, for example, communication systems 414 and 416. Software program(s) 526 can also include software modules configured to determine the values for the parameters h, x, y, z, y0, z0, and θ using software procedures created based on the relationships between these parameters according to the relationships described in expressions 1-7 as described above. Software program(s) 526 can also include software modules configured to store the values of at least some of these parameters, such as physical dimension h and the coordinates along the y-axis (e.g., y, y0, etc.), in memory 524, for future location determination (e.g., when image data is not available).

Moreover, software program(s) 526 can also include software modules configured to combine three-dimensional coordinates of the target determined based on different input sources (e.g., from GPS data, from image data, etc.) according expressions 1-7, to determine the location of the target, and may include an optimization algorithm such as a Kalman filter.

Further, software program(s) 526 can also include software modules configured to communicate with IMU 412 to receive information about a motion of system 400 (e.g., speed and direction of motion, yaw angle, etc.), and to determine the three-dimensional coordinates of the target based on the information. Software program(s) 526 can also include software modules configured to control a motion of system 400 (e.g. by configuring the actions of propellers 410 via I/O devices 522) based on a determined location of the target.

Figure 6:
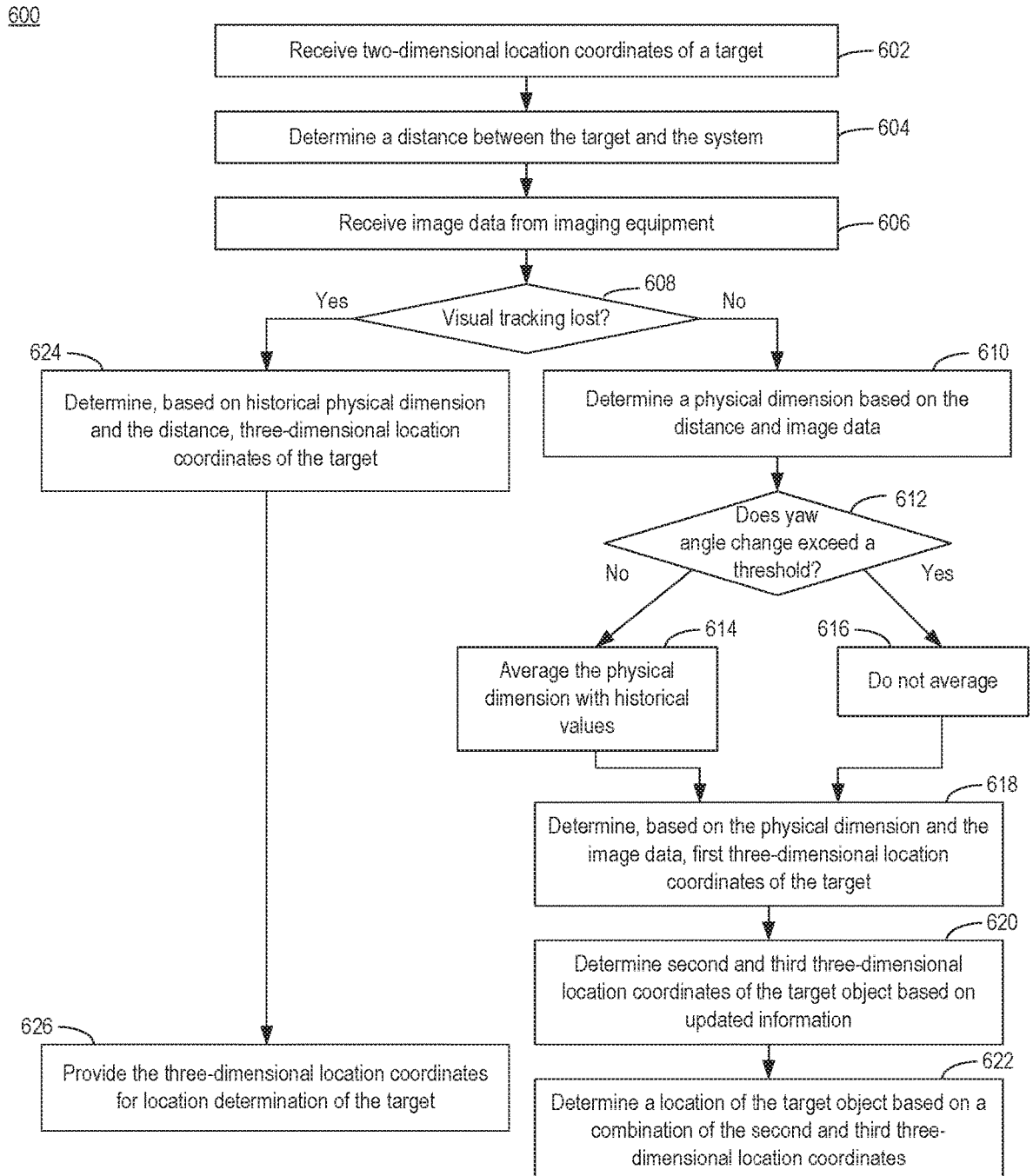
FIG. 6 is a flowchart illustrating an exemplary sequence of steps that may be performed for determining three-dimensional location coordinates of a target based on image and location data of the target, according to embodiments of the present disclosure.

Reference is now made to FIG. 6, which illustrates a sequence of steps that performs an exemplary process 600 for determining three-dimensional coordinates of a target based on image and location data of the target, according to embodiments of the present disclosure. The process of FIG. 6 may be implemented by a tracking system, which can be implemented in software, hardware, or any combination thereof. For purposes of explanation and not limitation, the process 600 will be described in the context of systems 400 and 500, such that the disclosed process may be performed by software executing in controllers 510 and/or tracker 150.

In step 602, the system receives two-dimensional location coordinate data of the target. The system may receive the two-dimensional location coordinate data of the target via communication system 416 of FIG. 4. The two-dimensional location coordinate data can be generated from a GPS receiver (or any other satellite navigation system), and/or from a combination of GPS data and IMU data.

After receiving the two-dimensional location data of the target, the system can determine a distance between the target and the system, in step 604. For example, the system receives its own three-dimension location data, and then determines the relative location of the target with respect to the system. The relative location may be represented as three-dimensional coordinates (x, y, z) as shown in FIG. 3.

The system also receives image data from imaging equipment, in step 606. The system can extract pixel data associated with the target which are included in the image data, and based on the pixel data, determine whether visual tracking is lost, in step 608. The visual tracking can be lost when, for example, the target moves away from the field of view of imaging equipment 406. The determination of whether visual tracking is lost can be based on various criteria. As an illustrative example, the system may be configured to track a plurality of features on the target and to determine a physical dimension (e.g., physical dimension h of FIG. 3) based on the pixel coordinates of the features. If the system detects that the pixel data for at least one of the features is missing, and that the physical dimension cannot be determined, the system may determine that visual tracking is lost.

If the system determines that visual tracking has not been lost, in step 608, the system may proceed to step 610 to determine a physical dimension (e.g., physical dimension h of FIG. 3). The system may extract the pixel data associated with a plurality of features (e.g., features 301 and 302 of FIG. 3) from the image data, and determine the pixel coordinates (e.g., (u, v1) and (u, v2) of FIG. 3) associated with the features. Based on the pixel coordinates, the distance between the target and the system determined in step 604, as well as other information such as focal length f, pitch angle θ, etc., the system can determine the physical dimension of the target based on the relationships described in expressions 1-7 as discussed above.

After determining the physical dimension in step 610, the system can proceed to step 612 to determine whether the system experiences a yaw angle change, and whether the angle change exceeds a threshold. In some embodiments, the threshold can be 10 degrees. If the system determines that the yaw angle change does not exceed the threshold in step 612, the system may proceed to step 614 and determine the physical dimension based on an average between the value determined in step 610 and historical values of the physical dimension. On the other hand, if the system determines that the yaw angle change does not exceed the threshold in step 610, the system may proceed to step 616 and determine not to average the values, and use the value of the physical dimension determined in step 610 for the next step. As discussed above, the system may maintain a running average for the value of physical dimension h, to reduce the effect of noise, until the system changes a course of movement and exhibits a certain degree of change in yaw angle. In this case, since the field of view of the camera has changed, the system may determine to reset the running average with the new value of the physical dimension.

After determining the physical dimension, the system can then proceed to step 618 to determine, based on the physical dimension and the image data, first three-dimensional location coordinates of the target, according to expressions 1-7.

In step 620, the system may also determine second and third three-dimensional location coordinates of the target based on updated information. For example, the system may receive second image data, which can include a subsequent image of the target. The system can determine the updated two-dimensional pixel location coordinates (u, v1) and (u, v2) for the plurality of features (e.g., features 301 and 302 of FIG. 3). The system may then determine second three-dimensional location coordinates (x, y, z) based on the updated pixel location coordinates (u, v1) and (u, v2), as well as the physical dimension determined in steps 614 or 616, according to expressions 1-7. Moreover, the system can also determine third three-dimensional location coordinates of the target, based on updated two-dimensional location coordinates of the target received from GPS (or from any other satellite navigation system).

After determining the second and third three-dimensional location coordinates in step 620, the system can proceed to step 622 to determine a location of the target based on a combination of the second three-dimensional location coordinates (determined in step 618) and the third three-dimensional location coordinates (determined in step 620). The combination may include, for example, employing an optimization algorithm, such as a Kalman filter, to determine a parametrized model that tracks a location of the target. The system may first determine the parameters associated with the parameterized model based on the second three-dimensional coordinates, and then update the parametrized model based on, for example, the third three-dimensional location coordinates, the speed and direction of motion of the system, the effect of noise and timing uncertainty, the effect of filtering, etc. The system can then maintain the parametrized model and update the associated parameters based on new GPS location coordinates and new location coordinate information determined based on subsequent images, as the target moves.

Referring back to step 608, if the system determines that visual tracking is lost, the system may proceed to step 624 to determine, based on historical physical dimension and the distance (determined in step 602), three-dimensional location coordinates of the target. As an illustrative example, based on a determination that the target is moving on a flat terrain, the system may assume that the y coordinate of the target (which can determine a vertical distance between the system and the target) remains constant. In this case, the system may determine the x and z coordinate of the target based on, for example, previously-determined physical dimension value h, previously-determined values for y and y0, and the distance (based on, for example, two-dimensional location coordinates of the target and the three-dimensional location coordinates of the system). The system can then proceed to step 626 and provide the three-dimensional location coordinates, determined in step 624, for location determination of the target.

Figure 7:
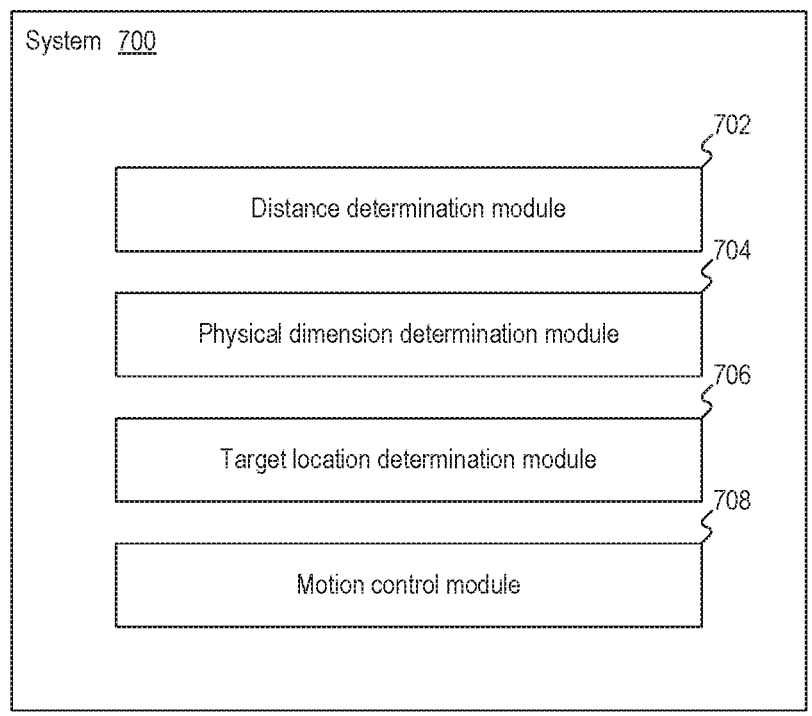
FIG. 7 is a schematic diagram of an exemplary system for determining three-dimensional coordinates of a target based on target image and location data, according to embodiments of the present disclosure.

Reference is now made to FIG. 7, which is a schematic block diagram of an exemplary system 700 determining three-dimensional coordinates of a target based on target image and location data, according to embodiments of the present disclosure. As shown in FIG. 7, system 700 includes a distance determination module 702, a physical dimension determination module 704, a target location determination module 706, and a motion control module 708.

For the purposes of this disclosure, "modules" may be implemented in software, hardware, firmware, a mix of any of those, or the like. For example, if the disclosed "modules" are implemented in software, they may be stored in memory 524 of system 500 as components of program(s) 526, and include code instructions executable by one or more processors, alone or in various combinations with other modules disclosed in this or other embodiments. On the other hand, the disclosed "modules" can also be implemented in hardware such as, for example, application specific integrated circuits (ASIC), field-programmable gate array (FPGA), etc. System 700 may be housed in, for example, tracker 150.

Distance determination module 702 can determine a distance between a target and tracker 150. For example, distance determination module 702 can receive two-dimensional location coordinates of the target, as well as three-dimensional location coordinates of the tracker, and determine a distance between the target and the tracker. In some embodiments, distance determination module 702 is configured to perform, for example, steps 602 and 604 of FIG. 6.

Physical dimension determination module 704 can determine, from image data of the target, two-dimensional pixel coordinate data associated with a plurality of features of the target. Physical dimension determination module 704 can also determine, based on the image data, whether visual tracking is lost, and determine a physical dimension associated with the plurality of features accordingly. For example, if visual tracking is lost, physical dimension determination module 704 may determine to provide a previously-determined physical dimension. On the other hand, if visual tracking is not lost, physical dimension determination module 704 may determine a physical dimension based on the distance determined by distance determination module 702 and the two dimensional pixel coordinate data. Physical dimension determination module 704 may also receive information about a yaw angle of the tracker, and determine whether to maintain a running average of the physical dimension or to reset the average based on a change in the yaw angle. In some embodiments, physical dimension determination module 704 is configured to perform, for example, steps 606-616 of FIG. 6.

Target location determination module 706 can be configured to determine, based on the physical dimension provided by physical dimension determination module 704, and at least one of the two-dimensional pixel coordinate data or the distance, three-dimensional location coordinate data of the target with respect to the apparatus. For example, the system may receive updated image data and determine updated two-dimensional pixel coordinates, and determine first three-dimensional location coordinate data of the target. The system may also receive updated two-dimensional location coordinate data of the target, and determine second three-dimensional location coordinate data of the target. The system can then determine a location of the target based on a combination of the two sets of three-dimensional location coordinates. The combination may include, for example, employing an optimization algorithm, such as a Kalman filter. In some embodiments, target location determination module 706 is configured to perform, for example, steps 618-624 of FIG. 6.

Motion control module 708 can be configured to provide one or more control signals to the tracker to control a motion of the tracker based on the target location. For example, to maintain a distance between the tracker and the target, motion control module 708 can control the propellers of the tracker to change its direction and speed.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. It is to be understood that the examples and descriptions in this disclosure have been arbitrarily defined herein for the convenience of the description. The disclosed systems and methods are not limited to these simplified examples, and other features and characteristics may be considered so long as the specified functions are appropriately performed.

While certain disclosed embodiments have been discussed with respect to UAVs for purposes of discussion, one skilled in the art will appreciate the useful applications of disclosed methods and systems for identifying targets. Furthermore, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, but instead are defined by the appended claims in light of their full scope of equivalents.

What is claimed is:

1. A method of tracking a movement of a target by an unmanned aerial vehicle (UAV), the method comprising:
   receiving absolute three-dimensional (3D) location coordinate data of the UAV from a first global positing system (GPS) receiver configured on the UAV;
   receiving absolute two-dimensional (2D) location coordinate data of the target from a second GPS receiver collocating with the target;
   determining a horizontal distance between the target and the UAV according to the absolute 3D location coordinate data of the UAV and the absolute 2D location coordinate data of the target;
   acquiring, by a camera of the UAV, image data of the target;
   determining, from the image data, 2D pixel coordinate data associated with a plurality of features of the target;
   determining a physical dimension associated with the target based on the 2D pixel coordinate data and the horizontal distance;
   determining, based on the physical dimension associated with the target and at least one of the 2D pixel coordinate data or the horizontal distance, 3D location coordinate data of the target with respect to the UAV; and
   controlling, based on the 3D location coordinate data of the target with respect to the UAV, a movement of the UAV.

2. The method of claim 1, wherein the absolute 2D location coordinate data of the target further includes data generated from information provided by an inertia measurement unit (IMU).

3. The method of claim 1, further comprising:
extracting the plurality of features of the target from the image data; and
determining pixel locations for the plurality of features;
wherein the 2D pixel coordinate data is determined based on the pixel locations.

4. The method of claim 1, wherein the physical dimension is determined also based on a focal distance of the camera.

5. The method of claim 1, wherein the physical dimension is determined also based on a pitch angle of at least one of the UAV or the camera.

6. The method of claim 1, further comprising:
receiving updated image data of the target;
determining whether pixels associated with the plurality of features are included within the updated image data; and
in response to the pixels associated with the plurality of the features being not included within the updated image data: determining, based on the physical dimension and the 3D location coordinate data, updated 3D location coordinate data of the target with respect to the UAV.

7. The method of claim 1, controlling the movement of the UAV based on the 3D location coordinate data of the target with respect to the UAV includes: adjusting a speed and a direction of the movement of the UAV based on a location of the target indicated by the 3D location coordinate data.

8. The method of claim 1, further comprising:
maintaining a running average of historical values of the physical dimension associated with the target;
determining a yaw angle change of the UAV; and
in response to the yaw angle change exceeding a threshold, adjusting the determined physical dimension according to the running average of the historical values of the physical dimension.

9. A tracking system configured to track a movement of a target, the tracking system comprising:
a memory storing executable instructions;
a camera configured to acquire image data of the target; and
at least one processor configured to execute the stored instructions to:
receive absolute three-dimensional (3D) location coordinate data of the UAV from a first global positing system (GPS) receiver configured on the UAV;
receive absolute two-dimensional (2D) location coordinate data of the target from a second GPS receiver collocating with the target;
determine a horizontal distance between the target and an unmanned aerial vehicle carrying the tracking system according to the absolute 3D location coordinate data of the UAV and the absolute 2D location coordinate data of the target;
determine, from the image data, 2D pixel coordinate data associated with a plurality of features of the target;
determine a physical dimension associated with the target based on the 2D pixel coordinate data and the horizontal distance;
determine, based on the physical dimension associated with the target and at least one of the 2D pixel coordinate data or the horizontal distance, 3D location coordinate data of the target with respect to the UAV; and
control, based on the 3D location coordinate data of the target with respect to the UAV, the movement of the UAV.

10. The tracking system of claim 9, wherein the absolute 2D location coordinate data of the target further includes data generated from information provided by an inertia measurement unit (IMU).

11. The tracking system of claim 9, wherein the at least one processor is further configured to execute the stored instructions to:
extract the plurality of features of the target from the image data; and
determine pixel locations for the plurality of features;
wherein the 2D pixel coordinate data is determined based on the pixel locations.

12. The tracking system of claim 9, wherein the physical dimension is determined also based on at least one of:
a focal distance of the camera, or
a pitch angle of at least one of the UAV or the camera.

13. The tracking system of claim 9, wherein the at least one processor is further configured to execute the stored instructions to:
receive updated image data of the target;
determine whether pixels associated with the plurality of features are included within the updated image data; and
in response to the pixels associated with the plurality of the features being not included within the updated image data: determine, based on the physical dimension and the 3D location coordinates, updated 3D location coordinate data of the target with respect to the UAV.

14. The tracking system of claim 9, wherein controlling the movement of the UAV based on the 3D coordinate data of the target with respect to the UAV includes: adjusting a speed and a direction of the movement of the UAV based on a location of the target indicated by the 3D location coordinate data.

15. A movable object, comprising:
one or more propellers;
one or more sensors configured to obtain speed and direction information of the movable object;
a camera configured to acquire image data of a target;
a radio communication system configured to receive signals from a satellite navigation system; and
a controller comprising:
a memory storing executable instructions;
a camera configured to acquire image data of the target; and
at least one processor configured to execute the stored instructions to:
receive absolute three-dimensional (3D) location coordinate data of the UAV from a first global positing system (GPS) receiver configured on the UAV;
receive absolute two-dimensional (2D) location coordinate data of the target from a second GPS receiver collocating with the target;
determine a horizontal distance between the target and the movable object based on the signals received from the radio communications system according to the absolute 3D location coordinate data of the UAV and the absolute 2D location coordinate data of the target,
determine, from the image data, two-dimensional pixel coordinate data associated with a plurality of features of the target;
determine a physical dimension associated with the target based on the 2D pixel coordinate data and the horizontal distance, determine, based on the physical dimension associated with the target and at least one of the 2D pixel coordinate data or the horizontal distance, 3D location coordinate data of the target with respect to the mobile object, and control the one more propellers based on the 3D location coordinate data, and the speed and direction information of the movable object.

\* \* \* \* \*